United States Patent
Ulsh et al.

(10) Patent No.: US 9,388,329 B2
(45) Date of Patent: Jul. 12, 2016

(54) STRETCHABLE, HAND-TEARABLE, CONFORMABLE, AND CINCHABLE REINFORCED ADHESIVE TAPE ARTICLES

(75) Inventors: Michael J. Ulsh, Broomfield, CO (US); John J. Rogers, Saint Paul, MN (US); Jon E. Stickrod, Woodbury, MN (US); John R. Jacobson, Newport, MN (US); Jeffrey J. Schwab, Inver Grove Heights, MN (US); Richard L. Peloquin, Maplewood, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 1141 days.

(21) Appl. No.: 11/959,052

(22) Filed: Dec. 18, 2007

(65) Prior Publication Data

US 2009/0155565 A1 Jun. 18, 2009

(51) Int. Cl.

| C09J 7/04 | (2006.01) |
|---|---|
| B32B 5/04 | (2006.01) |
| B32B 5/24 | (2006.01) |
| B32B 27/12 | (2006.01) |
| B32B 27/30 | (2006.01) |
| B32B 27/40 | (2006.01) |
| C09J 7/02 | (2006.01) |
| B32B 27/32 | (2006.01) |

(52) U.S. Cl.
CPC .......... *C09J 7/0296* (2013.01); *B32B 5/04* (2013.01); *B32B 5/24* (2013.01); *B32B 27/12* (2013.01); *B32B 27/30* (2013.01); *B32B 27/32* (2013.01); *B32B 27/40* (2013.01); *C09J 2201/622* (2013.01); *C09J 2400/263* (2013.01); *Y10T 428/249921* (2015.04); *Y10T 428/249953* (2015.04); *Y10T 428/249962* (2015.04); *Y10T 428/266* (2015.01); *Y10T 428/269* (2015.01); *Y10T 428/2848* (2015.01); *Y10T 428/31504* (2015.04)

(58) Field of Classification Search
None
See application file for complete search history.

(56) References Cited

U.S. PATENT DOCUMENTS

| 3,483,018 | A | | 12/1969 | Waldman | |
|---|---|---|---|---|---|
| 4,366,814 | A | | 1/1983 | Reidel | |
| 4,957,795 | A | | 9/1990 | Reidel | |
| 4,999,235 | A | | 3/1991 | Lunn et al. | |
| 5,162,150 | A | | 11/1992 | Buis et al. | |
| 5,169,707 | A | * | 12/1992 | Faykish et al. | 428/195.1 |
| 5,227,225 | A | | 7/1993 | Mamish | |
| 5,230,701 | A | | 7/1993 | Meyer et al. | |
| 5,308,695 | A | * | 5/1994 | Arakawa et al. | 428/354 |
| 5,397,298 | A | | 3/1995 | Mazza et al. | |

(Continued)

FOREIGN PATENT DOCUMENTS

| EP | 0 336 727 | A2 | 11/1989 |
|---|---|---|---|
| EP | 0 631 859 | A2 | 4/1995 |

(Continued)

OTHER PUBLICATIONS

Strong, A. B., "Plastics: Materials and Processing," 2nd ed., Prentice Hall, (2000).*

(Continued)

*Primary Examiner* — Frank D Ducheneaux
(74) *Attorney, Agent, or Firm* — Jeffrey M. Olofson

(57) ABSTRACT

Reinforced articles particularly adapted for use in combination with an adhesive to form reinforced adhesive tape articles that are stretchable as well as hand-tearable along with being highly conformable and cinchable.

13 Claims, 1 Drawing Sheet

(56) References Cited

U.S. PATENT DOCUMENTS

| | | | |
|---|---|---|---|
| 5,407,726 A * | 4/1995 | Serra et al. | 428/161 |
| 5,422,172 A * | 6/1995 | Wu | 442/62 |
| 5,616,387 A | 4/1997 | Augst et al. | |
| 5,629,079 A | 5/1997 | Battles et al. | |
| 5,681,654 A | 10/1997 | Mamish | |
| 5,747,131 A | 5/1998 | Kreckel | |
| 6,042,882 A | 3/2000 | Deeb | |
| 6,171,985 B1 * | 1/2001 | Joseph et al. | 442/346 |
| 6,183,861 B1 | 2/2001 | Carroll | |
| 6,211,099 B1 | 4/2001 | Hutto | |
| 6,296,904 B1 | 10/2001 | Zimmermann | |
| 6,410,464 B1 | 6/2002 | Menzies et al. | |
| 6,797,375 B1 | 9/2004 | Person et al. | |
| 6,835,256 B2 | 12/2004 | Menzies et al. | |
| 6,921,729 B2 * | 7/2005 | Schwab et al. | 442/43 |
| 6,994,763 B2 * | 2/2006 | Austin | 156/181 |
| 7,056,844 B2 | 6/2006 | Sheely | |
| 7,611,251 B2 * | 11/2009 | Thakkar et al. | 359/530 |
| 2003/0026967 A1 | 2/2003 | Joseph | |
| 2003/0134094 A1 | 7/2003 | Zafiroglu | |
| 2003/0215628 A1 | 11/2003 | Blomendel et al. | |
| 2004/0127121 A1 | 7/2004 | Kostuch et al. | |
| 2004/0175527 A1 * | 9/2004 | Shiota et al. | 428/43 |
| 2005/0129896 A1 | 6/2005 | Cohen et al. | |
| 2006/0068176 A1 * | 3/2006 | Zafiroglu et al. | 428/198 |
| 2006/0216473 A1 * | 9/2006 | Tomany et al. | 428/137 |
| 2007/0010777 A1 | 1/2007 | Dunshee et al. | |
| 2007/0071966 A1 | 3/2007 | Mussig et al. | |
| 2007/0151655 A1 | 7/2007 | Keller | |
| 2013/0135731 A1 * | 5/2013 | Smith et al. | 359/529 |

FOREIGN PATENT DOCUMENTS

| | | |
|---|---|---|
| GB | 2252528 A | 12/1992 |
| JP | 61275371 A | 5/1986 |
| JP | 2000-502739 | 6/2000 |
| WO | WO 01/53579 A1 | 7/2001 |
| WO | WO 2005/037908 A1 | 6/2005 |
| WO | WO 2005/052083 A1 | 6/2005 |

OTHER PUBLICATIONS

Definition of "Film" at http://www.merriam-webster.com/dictionary/film (2015).*

ATOFINA Z9470 data sheet from http://www.matweb.com/search/datasheettext.aspx?matguid=10d49b95a61a4305be1c262e7f8fb65b (2015).*

* cited by examiner

STRETCHABLE, HAND-TEARABLE, CONFORMABLE, AND CINCHABLE REINFORCED ADHESIVE TAPE ARTICLES

BACKGROUND

The present description is related to reinforced articles particularly adapted for use, in combination, with an adhesive to form reinforced adhesive tape articles. More particularly, the present description is directed to such reinforced articles for use in making reinforced adhesive tape articles that are stretchable as well as hand-tearable along with being highly conformable and cinchable.

Typical reinforced adhesive tape articles, such as a duct tape include, in combination, a backing layer generally coextensive to a reinforcing scrim layer, and a pressure sensitive adhesive layer covering the reinforcing scrim layer. The materials selected for the reinforced adhesive tape articles generally exhibit strength and are normally stretch resistant. Such tapes are also generally conformable and adhere to many different substrates having many different surface textures. Because the tapes possess strength and stretch resistance, they ordinarily are hand-tear resistant as well. In some circumstances, tear-propagating perforations may be added for facilitating hand-tearing properties. While this has proven successful, nonetheless, perforating is, of course, an additional processing step requiring specialized apparatus and processing conditions. Accordingly, these additional apparatus and processing requirements add to overall time and costs of manufacturing. Moreover, while the reinforced adhesive tape articles have demonstrated a high degree of versatility for countless different uses, there are, nevertheless, situations (e.g., wrapping around small diameter pipes or applications to other odd and uneven surfaces) wherein their physical characteristics limit their ability to be as highly conformable as might otherwise be desirable. For instance, some reinforced adhesive tape articles, when adhered to some uneven substrates, leave spaces or gaps that may compromise benefits of the sealing intended thereby.

While reinforced adhesive tape articles, such as duct tape, provide innumerable benefits, there is, nevertheless, a continuing desire for improvements, particularly with respect to providing even more conformable reinforced adhesive tape articles that are also stretchable, easily hand-tearable, as well as cinchable.

SUMMARY

There are needs for continuing improvements with respect to adhesive tapes, such as duct tapes, that are more stretchable, easily-tearable, cinchable as well as conformable compared to known adhesive tapes.

According to one exemplary embodiment of the present description, provision is made for a reinforced article adapted to be used, in combination, in a conformable reinforced adhesive tape. The reinforced article comprises: an elastomeric polymeric backing layer having opposing first and second major surfaces; and, an elastomeric polymeric reinforcing material layer carried along at least one of the first and second major surfaces, wherein the backing layer and the reinforcing material layer of the reinforced article exhibit an elongation extension at break of about at least about 25 to 60%; and, tensile strength greater than about 10 lb/in (17.5 N/cm) at break.

Another exemplary embodiment of the present description is directed to a length of reinforced adhesive tape, wherein the noted reinforced article, as described above, is combined with an adhesive layer in generally covering relationship to the reinforcing material layer on the backing layer. In another exemplary embodiment, the adhesive layer may be a pressure-sensitive adhesive capable of application to a variety of surfaces.

DETAILED DESCRIPTION

Figure 1:
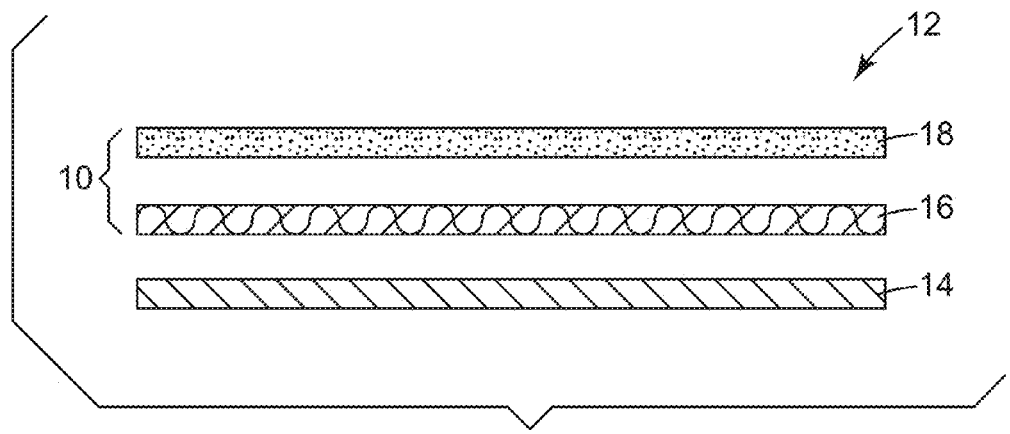
FIG. 1 is a schematic view of a reinforced adhesive tape formed according to the principles of the present description.

Reference is made to the drawing for illustrating one exemplary embodiment of a reinforced article 10 particularly adapted to be used in combination in a reinforced adhesive tape article 12 that possess extensible or stretchable characteristics with sufficient tensile strength that enables hand-tearability of the tape article. As will be described, the properties of the reinforced adhesive tape article 12 enable it to be highly conformable and, due to increased elastic recovery properties, improve its ability to be highly cinchable relative to known reinforced tape articles.

In one exemplary embodiment, the reinforced article 10 includes, in combination, an elastomeric backing layer 14 and an elastomeric reinforcing layer 16. For forming the reinforced adhesive tape article 12, an elastomeric adhesive layer 18 is also provided, in combination, in a substantially covering relationship to the reinforcing layer 16. The reinforced adhesive tape article 12, as will be described, presents advantages over known types of similar articles. The advantages include, but are not limited to, enhanced stretchability, hand-tearability despite being stretchable, as well as having relatively higher conformability and elastic recovery properties than known types of reinforced adhesive tape articles.

The elastomeric backing layer 14 exhibits stretchiness or extensible properties typically exceeding elongation properties of standard types of duct tape, such as those described in U.S. Pat. No. 7,056,844 B2 directed to "Transparent Reinforced Tape" which is commonly assigned herewith and incorporated herein by reference. In one exemplary embodiment, the elongation or stretch characteristics of the materials that may be used include an elongation extension at break of greater than about 200% and more typically from about 300% to 500%. In addition to possessing the foregoing stretch or elongation properties, the backing layer 14 includes sufficient tensile strength so as to facilitate hand-tearing of the reinforced adhesive tape article 12 despite the stretchiness of the backing layer 14. In one exemplary embodiment, the backing layer 14 may have tensile strength in a range of about at least greater than about 25 lb/in (44 N/cm). In another exemplary embodiment, the backing layer 14 may have tensile strength in a range of about at least about 25 lb/in (44 N/cm) to about 60 lb/in (105 N/cm) at break. It has been determined that tensile strength in excess of about 60 lb/in (105 N/cm) at break presents a reinforced article that is relatively too stiff for successful hand-tearing let alone enabling the degree of conformability otherwise provided by the noted tensile strength ranges.

While the backing layer 14 may be made of a wide variety of materials suitable for backing layers used in particular for adhesive tape articles, it may be made of a polymeric film. The polymeric film may be in a range of materials that include, but are not limited to, a group consisting of polyolefin elastomers, polypropylene elastomers, polyvinyl elastomers, polyurethane elastomers, and blends thereof.

Table 1, below, lists descriptions of polymeric film backing layers 14 that have been used in samples tested. The list includes a description column of the trade names of the resins used to make the film backing layers, an acronym column that lists an acronym of the chemical names of the backing layers, while a third column describes, more completely, the acronym and where such a backing material may be obtained or is described. Film backings were constructed from these resins by use of a 19 mm Brabender extruder with a 6 inch single layer flat die cast extrusion at a temperature of about 190° C. Additional backing layers used in the samples tested include: 3M oriented polypropylene, such as described in U.S. Pat. No. 6,797,375; 3M Scotchcal™ 220-114, plasticized vinyl film product, commercially available from 3M Company, St. Paul, Minn.; 3M Tagaderm™, polyurethane film product, commercially available from 3M Company, St. Paul, Minn.; and, GF-10 low density polyethylene (LDPE) film commercially available from Pliant Corporation, Schaumberg, Ill.

obtained using an Instron Model 5544 tester, commercially available from Instron Corporation, Norwood, Mass., at 73.4+/−3.6° F. (23.0±2.0° C.) according to ASTM D3759.

2) Elongation is film deformation or ductility (measured at break point). Measurements were obtained using an Instron Model 5544 tester at 73.4+/−3.6° F. (23.0+/−2.0° C.) according to ASTM D3759. The gauge length and separation speed was set according to the film elongation range:
  a. For films having less than 20% elongation, a 5 inch (12.7 cm) gauge length and a separation rate of 5 inches per minute (12.7 cm/min) was used.
  b. For films having an elongation between 20% and 100%, a 4 inch (10.2 cm) gauge length and a separation rate of 12 inches per minute (30.5 cm/min) was used.
  c. For films having an elongation greater than 100%, a 2 inch (5.1 cm) gauge length and a separation rate of 20 inches per minute (50.8 cm/min) was used.

3) Modulus is a measure of film stiffness. Higher values indicate more resistance to film stretching (deformation).

TABLE 1

Plastic Film Backing Descriptions

| Trade Name | Acronym | Chemistry |
| --- | --- | --- |
| Fina Z9470 | PP | Polypropylene, commercially available from Fina Total Petrochemicals USA, Inc., Houston, TX. |
| Dupont Elvaloy ™ 1209AC | EMA | Ethylene-Methyl Acrylate Copolymer, commercially available from Dupont Company, Wilmington, DE. |
| Dupont Elvaloy ™ 2112AC | EEA | Ethylene-Butyl Acrylate Copolymer, commercially available from Dupont Company, Wilmington, DE. |
| Dupont Elvaloy ™ 2116AC | EEA | Ethylene-Ethyl Acrylate Copolymer, commercially available from Dupont Company, Wilmington, DE. |
| Dupont Elvaloy ™ 3217AC | EBA | Ethylene-Butyl Acrylate Copolymer, commercially available from Dupont Company, Wilmington, DE. |
| Dow Primacor ™ 1410 | EAA | Ethylene-Acrylic Acid Copolymer, commercially available from Dow Chemical Company, Midland, MI. |
| Dupont Surlyn ™ 1701-1 | Surlyn | Ethylene-Methacrylic Acid Copolymer, commercially available from Dupont Company, Wilmington, DE. |
| Dupont Elvax ™ 3135B | EVA | Ethylene-Vinyl Acetate Copolymer, commercially available from Dupont Company, Wilmington, DE. |
| Dow 6109T | LLDPE | Linear Low Density Polyethylene, commercially available from Dow Chemical Company, Midland, MI. |
| Dupont Bynel ™ 3101 | EVA/Acrylate | Ethylene-Vinyl Acetate, acid/acrylate modified Copolymer, commercially available from Dupont Company, Wilmington, DE. |
| 3M Scotchcal ™ 220-114 | | Cast plasticized Vinyl, commercially available from 3M Company, St. Paul, MN. |
| Pliant Polyolefin Blend | LDPE/LLDPE | Extruded Low Density/Linear Low Density Polyethylene from Pliant Corporation, Schaumberg, IL |
| 3M Tagaderm ™ | | Polyurethane-available from 3M Company St. Paul, MN. |
| 3M Oriented Polypropylene | O-PP | Biaxial Oriented Polypropylene, - see U.S. Pat. No. 6,797,375 available from 3M Company. |
| 3M Transparent Duct 2120 | LDPE | Low Density Polyethylene, available from 3M Company, St. Paul, MN. |

Experimental Results

A number of samples were tested according to the present description using the testing machines and methodologies described herein. The experimental data gathered from such tests are recorded in the tables and FIG. 2 below employing testing methodologies as described herein.

Test Methods

The performance properties of films, as related to their utility for a duct tape with higher elongation properties, were measured by the following test procedures at room temperatures:

1) Tensile Strength is a measure of energy to break (measured at break point) and is a characteristic of film toughness. It is the area under the stress-strain curve. Tensile values are obtained with film elongation. Measurements were Young's modulus (elasticity) measurements were obtained using an Instron Model 5544 tester at 73.4+/−3.6° F. (23.0+/−2.0° C.) according to ASTM D3759, using a 10 inch (25.4 cm) gauge length and a separation rate of 0.5 inches (1.3 cm/min) per minute.

4) Elastic Recovery is a measure of recovery from extension, permanent deformation and stress retention of film. The elastic recovery properties are determined by subjecting the film samples to specified extensions and measuring the quantity of recovery and permanent change with respect to the original sample's dimensions. Elastic recovery values for the samples that were obtained were up to extension at break following ASTM test method D5459-95.

The physical properties (tensile, elongation and modulus) of the above backing layer films, as related to their utility for a duct tape with higher elongation properties than known duct tapes, were measured by the test procedures previously described, and are shown in Table 2 below. The data demonstrate that some of the films, such as polyolefin, samples 2-10, and the polyurethane film, sample 12, were less stiff and are exemplary of materials that might be good as a backing layer that would make a duct tape article more conformable than known duct tape articles. The tensile properties of the various films were equal to or better than the sample C2.

description. The reinforcing layer 16 may be more extensible than scrim that may have typically been used for reinforced adhesive tape. In one exemplary embodiment, warp drawn yarns may be used. These may be prepared from partially oriented yarn (POY) made of, for example, polyester. POY may be made using a variety of known techniques including being spun at predetermined speeds. Besides polyester, other natural, synthetic, or blends thereof, such as described in U.S.

TABLE 2

Physical Properties of Plastic Film Backing: Tensile, Elongation and Young's Modulus

| Sample | Film | Caliper mils (cm) | Tensile at Break lb/in (N/cm) | Elongation at Break | Young's Modulus psi (MPa) |
|---|---|---|---|---|---|
| 1 | Fina Z9470 | 4.1 (0.010) | 8.8 (15.4) | 370% | 39,000 (269) |
| 2 | Dupont Elvaloy ™ 1209AC | 4.4 (0.011) | 12.5 (21.9) | 520% | 10,000 (69) |
| 3 | Dupont Elvaloy ™ 2112AC | 4.4 (0.011) | 13.6 (23.8) | 440% | 9,000 (69) |
| 4 | Dupont Elvaloy ™ 2116AC | 4.2 (0.011) | 10.6 (18.6) | 510% | 7,000 (48) |
| 5 | Dupont Elvaloy ™ 3217AC | 4.0 (0.010) | 12.6 (22.0) | 600% | 9,000 (69) |
| 6 | Primacor ™ 1410 | 4.5 (0.011) | 15.7 (27.5) | 340% | 16,000 (110) |
| 7 | Dupony Surlyn ™ 1701-1 | 6.1 (0.015) | 27.1 (47.5) | 320% | 39,000 (269) |
| 8 | Dupont Elvax ™ 3135B | 5.6 (0.014) | 22.0 (38.5) | 520% | 11,000 (76) |
| 9 | Dow 6109T | 3.0 (0.008) | 8.6 (15.1) | 260% | 12,000 (83) |
| 10 | Dupont Bynel ™ 3101 | 6.6 (0.017) | 19.9 (34.8) | 540% | 6,000 (41) |
| 11 | Scotchcal ™ 8220-114 | 1.9 (0.005) | 5.7 (10.0) | 130% | 66,000 (455) |
| 12 | Tagaderm ™ Urethane | 1.0 (0.003) | 7.9 (13.8) | 410% | 5,000 (34) |
| C1 | 3M Oriented Polypropylene | 1.3 (0.003) | 30.7 (53.8) | 50% | 191,000 (1317) |
| C2 | Pliant GF-10 low density polyethylene | 2.5 (0.006) | 10.3 (18.0) | 160% | 25,000 (172) |

Note:
Tensile and Elongation test at 2 inch (5.1 cm) gauge length and 20 inch/min (50.8 cm/min) separation rate. Modulus test at 5 inch (12.7 cm) gauge length at 0.5 in/min (1.3 cm/min) separation rate.

In addition, the backing layer 14 may have thicknesses in the range of about 1 mil (0.0025 cm) to about 7 mils (0.0178 cm). In another exemplary embodiment, the thickness range may be about 2-3 mils (0.005-0.007 cm). In general, the thickness range is determined by the type of properties the reinforced adhesive tape is to possess. As such, the materials and thicknesses of the backing layer 14 may be selected to be used in any suitable combination with the reinforcing layer 16 so as to produce the advantages that have been and will be described herein. Clearly, with thicknesses that are too thick or too thin, the reinforced adhesive tape might not be able to perform in the intended manner, such as by being too hard to hand tear or too easily tearable during application to substrates. While a polymeric backing layer 14 has been noted above, the present description envisions other suitable materials, such as non-woven materials in a composite backing construction.

Reference is made to the reinforcing material or layer 16. The reinforcing layer should be extensible, and possess sufficient tensile strength, which when used in combination with the backing material or layer, noted above, provides a reinforced article having the physical characteristics of the present description. According to the present description, the reinforcing layer is directed to, at least, providing: a suitable balance between elongation so that it may elongate sufficiently to work in combination with the backing layer 14, whereby it exceeds the stretchiness of conventional duct tape, but has strength for performing as a reinforcing layer without distorting or breaking; as well as is able to be torn manually in straight or transverse directions with respect to the length of the tape, as well as is cinchable and highly conformable as will be described below.

It will be appreciated that a variety of materials may be used that are consistent with the teachings of the present Pat. No. 7,056,844, may be used. These other suitable materials include, without limitation, fiberglass, acetate, acrylic, modacrylics, rayon, nylon, cotton, polyethylene, polypropylene, polyamine, and Kevlar.

In addition, the reinforcing layer 16 may have a construction similar to that described in the noted U.S. Pat. No. 7,056,844. In this regard, fiber used to make the polyester POY reinforcing layer may be individual or in bundles, and those fibers and/or bundles of fibers may be randomly disposed to form a non-woven reinforcing layer, or may be disposed in a rectangular pattern with space between the fibers or bundles to form a reinforcing layer that may be manually broken at the intersections between the woven fibers or bundles when the backing layer is torn to guide straight line tearing of the tape in either of two directions at right angles to each other. When the fibers are in bundles they may be disposed so that they can easily be wetted by an adhesive (i.e., fibers in bundles that are twisted, knitted, tacked at close intervals or are in non-woven layers have been found to be more difficult to wet than when the fibers are loosely laid in the bundles) and may have diameters that are sufficiently small so that almost all of the fibers in the bundles may be wetted by the adhesive when the tape is applied to a substrate. The deniers of the individual fibers in bundles of fibers forming the scrim may generally be in the range of about 0.10 to 15 denier, about 0.75 to 10 denier, and about 1 to 5 denier; and the total of the deniers of the individual fibers in the bundles may generally be less than about 500, may be less than about 300 and may be about 100. It will be appreciated that many different materials, denier, and other thread constructions may be selected for other reinforcing layers that are equivalent, as is known, by one having ordinary skill in the textile arts to the foregoing description of reinforcing layer materials, physical characteristics and constructions.

In one exemplary embodiment of the present disclosure, a 25×7 threads per inch (cross web by down web) 115×150 denier (cross web by down web) polyester partial oriented yarn (POY) scrim from American Fiber and Finishing, Inc., Newberry S.C. had a warp drawn elongation value of 60% was used for the samples 25-31. It will be understood that a drawn down elongation value of about 60% provides a sufficiently stretchy elongation for a scrim. Such an elongation value is higher than that provided by known scrims used in reinforced adhesive duct tape articles, such as the scrim described in U.S. Pat. No. 7,056,844. The polyester scrim described in the last noted patent may have had drawn down elongation value of about between to 20-25%. In contrast, the present disclosure envisions the use of POY scrim that may have greater elongation characteristics, for example, the polyester POY may have drawn down elongation values of greater than 30% to about 60% and, more typically, from about 40-60% elongation. It is believed that the polyester POY scrim being drawn down to about 60% elongation approaches an upper limit to the amount of extension permitted by a polyester POY scrim, of the type described above, and yet retains sufficient tensile strength to function as a scrim in an adhesive tape article, such as a duct tape while providing the advantages of the present invention.

According to the present description, whatever materials are selected and whatever processes are used to make the reinforcing layer, they should produce a reinforcing layer having the physical characteristics, described herein, for use in combination with a backing layer, as described herein, to produce the reinforced article having the characteristics of the present description.

In the present description, use may be made of a coated adhesive layer 18 that may substantially cover the reinforcing scrim layer 16. The thinner the fabric profile and the more space occupied by the fabric yarns, the less adhesive covers the fabric spaces and surfaces. In one exemplary embodiment, the adhesive layer 18 is envisioned to be releasably securable to a substrate (not shown) to which the reinforced adhesive tape article 12 is to be attached. A variety of adhesives systems may be used for the adhesive layer in the present description. Given the intended use in a reinforced adhesive tape article 12 product, the present exemplary embodiment envisions use of a pressure-sensitive adhesive for adhesive layer 18. The pressure-sensitive adhesive may be of the type typically used with a duct tape. Accordingly, a wide variety of pressure-sensitive adhesive formulations exist. However, given the stretchy nature of the reinforced adhesive tape article 12, the thickness of the adhesive layer 18 should be adequate to allow for such stretching without losing the adhesive characteristics when applied.

In this regard, the adhesive layer 18 used in the following samples described in Table 3 may be a pressure sensitive adhesive comprised of a Kraton asymmetric block copolymer with a tackifier and plasticizer, dissolved to 45% solids in toluene. The procedure utilized to prepare the samples listed in Table 3 is as follows: (1) coat the above noted pressure sensitive adhesive solution to about 6 mils (0.015 cm) thick onto a siliconized release liner and dry for 10 minutes at 150° F. (65° C.) in a forced air oven, (2) laminate the scrim material by hand with the use of a six inch rubber ink pad roller to the dried pressure sensitive adhesive, (3) coat the noted pressure sensitive adhesive solution, that is 6 mils (0.015 cm) thick, onto the scrim composite from step (2) and dry for 10 minutes at 150° F. (65° C.) in a forced air oven, (4) corona treat the plastic film backing material samples with a hand held high frequency spark tester Model BD-20 available from Electro-Technic Products, Inc., Chicago, Ill., and laminate to a pressure sensitive adhesive composite from step (3) with a 2 roll rubber squeeze laminator at about 20 psi (138 kPa).

It will be appreciated that exemplary pressure-sensitive adhesives may include removable and permanent adhesives. The pressure-sensitive adhesives contemplated for use may be selected from a group consisting of organic solvent based acrylics, waterborne acrylics, silicone adhesives, natural rubber based adhesives, and thermoplastic resin based adhesives. While the adhesive layer is coated it may be applied by other suitable approaches.

Table 3 illustrates experimental results comparing data of two different reinforced article constructions envisioned to be usable for a reinforced adhesive tape, such as a duct tape. One of the types of reinforced articles, see samples 17-23, include a listing of different backing materials, each of which has been laminated to a polyester scrim as described in U.S. Pat. No. 7,056,844. The scrim used had an elongation value of about 20-25%. The other reinforced article type, see samples 25-31, includes the identified backing layer materials, as used in samples 17-23, but with a different reinforcing scrim layer made in accordance with the present description. As noted, in one exemplary embodiment of the present disclosure, a 25×7 threads per inch (cross web by down web) 115×150 denier (cross web by down web) polyester partial oriented yarn scrim from American Fiber and Finishing, Inc. having a drawn elongation of about 60% was utilized. Reference is made to U.S. Pat. No. 6,211,099 for a description of the construction of such a scrim.

The present disclosure envisions use of a POY scrim having elongation values in the range of from about 30-60%, and from about 40-55%. The physical properties of the two reinforced articles listed in samples 17-23 were evaluated by measuring their tensile strength, modulus (Young's) of elasticity, and elongation properties. The results of this testing are shown by the data in the appropriate columns of Table 3, which columns also include the corresponding thicknesses (caliper total in mils) of the samples.

TABLE 3

Film Backing + Scrim Physical Properties: Tensile, Elongation & Young's Modulus

| Sample | Film + Scrim | Caliper Total Mils (cm) | Tensile at Break lb/in (N/cm) | Elongation at Break | Young's Modulus lb/in² (MPa) |
|---|---|---|---|---|---|
| | Scrim | | | | |
| 17 | Fina Z9470 | 7.1 (0.018) | 22.2 (38.9) | 22% | 31,000 (214) |
| 18 | Dupont Elvaloy ™ 1209AC | 7.4 (0.019) | 14.7 (25.7) | 20% | 19,000 (131) |
| 19 | Dupont Elvaloy ™ 3217AC | 7.0 (0.018) | 13.4 (23.5) | 19% | 16,000 (110) |
| 20 | Dow 6109T | 6.0 (0.015) | 18.4 (32.2) | 22% | 21,000 (145) |
| 21 | Scotchcal ™ 8220-114 | 5.0 (0.013) | 23.1 (40.4) | 25% | 44,000 (303) |

TABLE 3-continued

Film Backing + Scrim Physical Properties: Tensile, Elongation & Young's Modulus

| Sample | Film + Scrim | Caliper Total Mils (cm) | Tensile at Break lb/in (N/cm) | Elongation at Break | Young's Modulus lb/in² (MPa) |
|---|---|---|---|---|---|
| 22 | 3M SBOPP | 4.3 (0.011) | 37.3 (65.3) | 69% | 71,000 (490) |
| 23 | Pliant GF-10 LDPE | 5.5 (0.014) | 18.3 (32.0) | 23% | 23,000 (158) |
| | Partial Oriented Scrim | | | | |
| 25 | Fina Z9470 | 7.1 (0.018) | 21.2 (36.9) | 42% | 59,000 (407) |
| 26 | Dupont Elvaloy ™ 1209AC | 7.4 (0.019) | 19.4 (34.0) | 45% | 41,000 (283) |
| 27 | Dupont Elvaloy ™ 3217AC | 7.0 (0.018) | 18.3 (32.6) | 41% | 35,000 (241) |
| 28 | Dow 6109T | 6.0 (0.015) | 19.2 (33.6) | 45% | 48,000 (331) |
| 29 | Scotchcal ™ 8220-114 | 5.0 (0.013) | 23.2 (40.6) | 53% | 73,000 (503) |
| 30 | 3M SBOPP | 4.3 (0.011) | 49.9 (87.4) | 59% | 124,000 (855) |
| 31 | Pliant GF-10 LDPE | 5.5 (0.014) | 21.6 (37.8) | 52% | 54,000 (372) |

Note:
Tensile and Elongation test at 5 inch (12.7 cm) gauge length and 5 inch/min (12.7 cm/min) separation rate. Modulus properties of the duct tape utilized a 5 inch (12.7 cm) gauge at 0.5 in/min (1.3 cm/min) separation rate.

The results of tensile, modulus, and elongation testing demonstrate that the physical properties of the polyester partial oriented yarn (POY) scrim having a drawn down elongation of about 60% effected control over the elongation properties of the reinforced article. As noted, the backing layer 14 had significant elongation values, but were far less extensive when used in combination with the reinforcing scrim layer 16. The reinforcing scrim layer may be used to provide a reinforced article that exhibits the degree of elongation provided by the present description along with tensile strength to enable hand tearability, conformability, and elastic recovery.

From the data of Table 3, the elongation at break values for the known scrim (see samples 17-23) and the backing layers using polyolefin was in a range of about 18 to 25%, with tensile at break from about 13 to 25 pounds/inch (31 to 44 N/cm). In contrast, the range of elongation at break values for samples 25-31 using the partial oriented polyester scrim (POY) being drawn down to 60% elongation and polyolefin backing layers was about 60%, with tensile at break values from about 13 to 25 pounds/inch (31 to 44 N/cm). It will be noted that while the reinforced article 10 (sample 30) exhibited twice as much elongation as sample 22, the biaxial oriented polypropylene (3M O-PP) film is considered too stiff to be useful in a reinforced adhesive article due its significantly higher modulus of elasticity (Young's) values.

As observed, the reinforced article comprising a backing layer and a partial oriented polyester scrim (POY) layer combination exhibited twice the degree of elongation as the combination of the known scrim and the backing layers without diminishing other physical properties useful in forming an adhesive article, such as a duct tape.

When the materials of the backing layer were combined with the POY reinforcing scrim layer in a reinforced article 10, the significantly higher elongation values of the backing layer decreased markedly from about 300-500% to 20-50%. It has been determined that the composition of the plastic backing film and the reinforcing layer influence both tensile strength and elongation properties of the reinforced article. As evident, the reinforced article constructions with a scrim made of partial oriented yarn using a 60% elongation (i.e., samples 25-31), demonstrated approximately two (2) times greater elongation compared to constructions with the known scrim, samples 17-23. However, it is noted that the elongation values for both the known and partially oriented yarn (POY) scrim and 3M oriented propylene (O-PP) (samples 22 and 30) were almost equivalent.

Samples shown in Table 4 were prepared by hot melt coating a 100% solid natural rubber base adhesive formulated with a tackifier and plasticizer to yield adhesion and shear properties typical for commercially available duct tapes, at a coating weight of 35 grains per 24 square inches (164 gram per square meter), to form a pressure sensitive tape. Sample 32 was made with a 3.2 mil (0.008 cm) thick low density polyethylene film from Pliant Corporation (called P1) having a tensile of 9.2 lbs/inch (16.1 N/cm), elongation of 494%, and modulus of 31,000 psi (214 MPa) and with an elongated partial oriented polyester scrim (POY) AF&F 25×7 threads per inch (96/150 Denier), 60% drawn elongation (POY-60%). Sample 33 was made with a film sample and with a known polyester scrim AF&F 25×7 (70/150 Denier) having less than about 30% drawn down elongation commercially available from American Fabric and Finishing, Inc. Sample 34 was made with a 2.5 mil (0.006 cm) thick low density polyethylene, linear low density polyethylene blend film from Pliant Corporation (called P2) having an elongation tensile of 13.7 lbs/inch (23.8 N/cm), elongation of 754%, and modulus of 10,000 psi (69 MPa) and with a partial oriented polyester yarn (POY) scrim AF&F 25×7 threads per inch (96/150 Denier), warp drawn 60% elongation.

Tensile, elongation and modulus test results for the example duct tapes are shown in Table 4. This testing demonstrated that no significant differences were observed in tensile, elongation, or modulus measurements between sample 32 and sample 34. However, compared to sample 33 having scrim described in U.S. Pat. No. 7,056,844, the samples 32 and 34 with a POY-60% scrim, exhibit approximately two (2) times higher elongation (stretch) as demonstrated by their corresponding elongation at break values. Also, sample 33 exhibited about 50% less elongation than the samples 32 and 34, as determined by the values in the elongation at break column. The modulus measurements of Table 4 show no significant differences between the various film and scrim combinations of duct tape constructions.

TABLE 4

Duct Tape Physical Properties: Tensile, Elongation & Young's Modulus

| Sample | Film + Scrim | Caliper Total mils (cm) | Tensile at Break lb/in (N/cm) | Elongation at Break | Young's Modulus lb/in² (MPa) |
|---|---|---|---|---|---|
| 32 | P2 + POY Scrim | 6.0 (0.015) | 23.7 (41.5) | 58% | 56,000 (386) |
| 33 | P2 + Std Scrim | 6.0 (0.015) | 37.3 (65.3) | 22% | 60,000 (414) |

TABLE 4-continued

Duct Tape Physical Properties: Tensile, Elongation & Young's Modulus

| Sample | Film + Scrim | Caliper Total mils (cm) | Tensile at Break lb/in (N/cm) | Elongation at Break | Young's Modulus lb/in² (MPa) |
|---|---|---|---|---|---|
| 34 | P1 + POY Scrim | 5.0 (0.013) | 20.4 (35.7) | 54% | 62,000 (427) |

Note:
Tensile and Elongation test at 2 inch (5.1 cm)gauge length and 20 inch/min (50.8 cm/min) separation rate.

Elastic recovery properties, which measures cinchability of the duct tapes (samples 32 thru 34), were measured according to test method ASTM D5459-95. The elastic properties of the above constructions were determined by subjecting the samples to specified extensions and measuring the quantity of recovery and permanent change with respect to the original samples dimensions. For this testing, elastic recovery measurements were made up to extension at break for each of the specimens.

Figure 2:
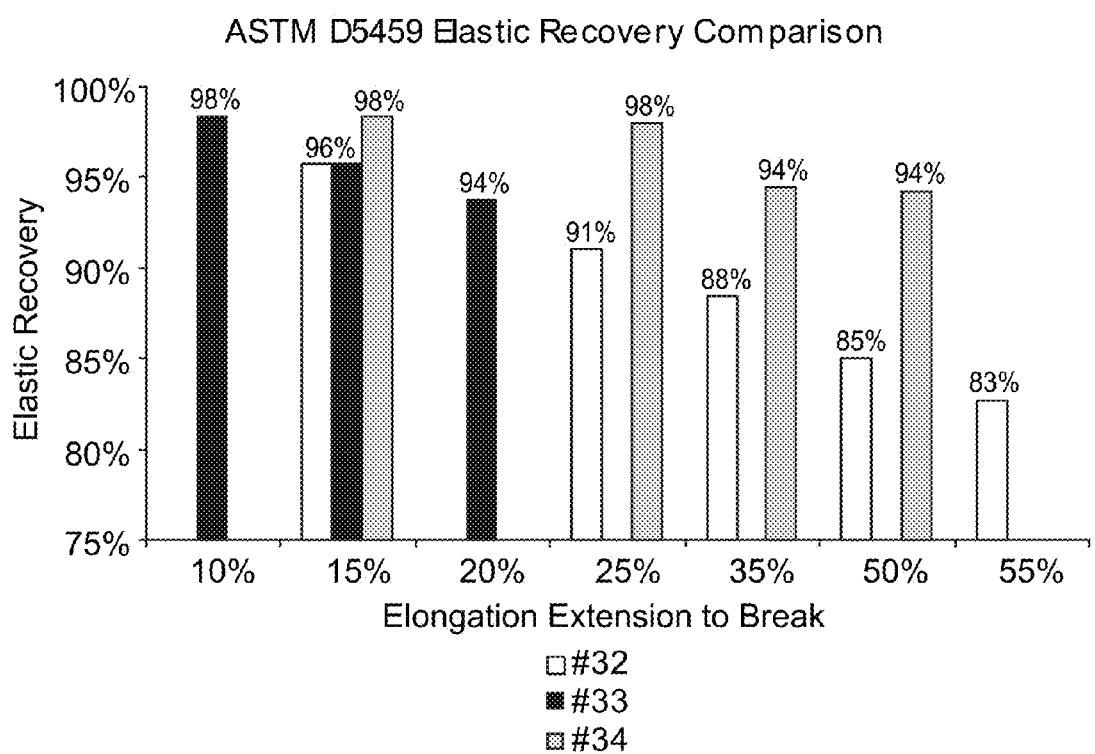
FIG. 2 is a chart showing elastic recovery for standard versus conformable duct tape constructions of the present description.

The results of this testing are shown in FIG. 2. The tape sample with known scrim, sample 33, broke at 22% elongation. Duct tape samples with the polyester POY-60% elongated scrim, that is samples 32 and 34, demonstrated elongation up to 58% to 54%; respectively before breaking, which confirms test results previously discussed. Because of the enhanced elastic recovery provided thereby, these samples were highly conformable and cinchable, especially when compared to known duct tape constructions.

However, the one significant difference of this test method compared to elongation or modulus testing is that it demonstrated the effect or influence of film backing properties with respect to overall duct tape physical properties containing scrim. Sample 34 with the higher elongation film backing exhibited significantly higher elastic recovery compared to sample 32 with the known LDPE film backing. The elastic recovery test results indicate that sample 34, with higher recovery values, will have better "cinching" or "snugness" properties as related to tape applications, such as hoses, tubing and packaging boxes. The data illustrate an elastic recovery from about 80 to 90% with an elongation extension to break from about 20% to 60%.

From FIG. 2, it can be determined that the samples of the present disclosure Sample 32 (POY-60%) scrim and backing film sample P1) as well as sample 34 (POY-60%) scrim and higher elongation backing film Sample P2) outperform the duct tape construction Sample 33. Samples 32 and 34 provide for enhanced elongation to break beyond the control samples as well as exhibit significantly enhanced elastic recovery, thereby providing for enhanced cinchability.

The above experimental data illustrated in the above Tables and FIG. 2 demonstrate the materials used and the dramatic effect brought about by the improved reinforced article 10 on the ability of the reinforced adhesive tape article 12 to provide improved stretchable, hand-tearable, conformable, and cinchable properties for reinforced adhesive tape articles relative to known reinforced adhesive tape articles.

The present disclosure may take on various modifications and alterations without departing from the spirit and scope. Accordingly, this disclosure is not limited to the above-described embodiments, but is to be controlled by limitations set forth in the following claims and any equivalents thereof.

The present disclosure may also be suitably practiced in the absence of any element not specifically disclosed herein. All patents and publications noted above, including any in the Background section are incorporated by reference into this document in total.

What is claimed is:

1. A conformable reinforced article for use in a reinforced tape, the reinforced article comprising: a backing layer having opposing first and second major surfaces wherein the backing layer is a continuous elastomeric polymeric film and the material of the backing layer is selected from the group consisting of polyolefin elastomers, polypropylene elastomers, polyvinyl elastomers, polyurethane elastomers, and any combination thereof; and, an elastomeric polymeric reinforcing material layer carried along at least one of the first and second major surfaces, wherein the reinforcing material layer is made of a reinforcing scrim material, and wherein the reinforced article exhibits hand-tearability in straight or transverse directions with respect to the length of the article, an elongation extension at break of about 25 to 60%, and a tensile strength greater than about 10 lb/in (17 N/cm) at break.

2. The reinforced article of claim 1, wherein the tensile strength of the reinforced article is between about 20 to 40 lb/in (35 to 70 N/cm).

3. The reinforced article of claim 2, wherein the reinforced article exhibits an elastic recovery from about 80 to 90%.

4. The reinforced article of claim 1, further wherein the backing layer exhibits an elongation extension at break of at least 50%.

5. The reinforced article of claim 1, further wherein the backing layer exhibits an elongation extension at break of about 300 to 500%.

6. The reinforced article of claim 1, wherein the reinforcing scrim material is selected from the group consisting of fiberglass, acetate, acrylic, modacrylics, rayon, nylon, polyester, cotton, polyethylene, polypropylene, polyamine, Kevlar, and any combination thereof.

7. The reinforced article of claim 6, wherein the reinforcing scrim material is made of partially oriented yarn having a drawn down elongation value in a range of from about 30% to about 60%.

8. The reinforced article of claim 7, wherein the partially oriented yarn reinforcing scrim has a drawn down elongation value in a range of from about 40% to about 55%.

9. The reinforced article of claim 1, wherein the backing layer has a thickness of about 1.0 mil to about 7.0 mils (0.002 cm to about 0.018 cm).

10. A reinforced adhesive tape article comprising:
    a reinforced article including:
        a backing layer having opposing first and second major surfaces wherein the backing layer is a continuous elastomeric polymeric film and the material of the backing layer is selected from the group consisting of polyolefin elastomers, polypropylene elastomers, polyvinyl elastomers, polyurethane elastomers, and any combination thereof,
        an elastomeric polymeric reinforcing material layer carried along at least one of the first and second major surfaces, wherein the reinforcing material layer is made of a reinforcing scrim material, and
        wherein the reinforced article exhibits hand-tearability in straight or transverse directions with respect to the length of the article, an elongation extension at break of about 25 to 60%, and a tensile strength greater than about 10 lb/in (17 N/cm) at break; and
    an adhesive layer applied to the reinforcing material layer.

11. The reinforced adhesive tape article of claim 10, wherein:
   the backing layer exhibits an elongation extension at break of about 300 to 500%;
   the reinforcing material layer is a partial oriented yarn (POY) scrim having a drawn down elongation of about 60%; and
   the reinforced article exhibits an elongation extension at break of 41 to 59%.

12. The reinforced adhesive tape article of claim 10, wherein the adhesive layer includes a pressure-sensitive material.

13. The reinforced adhesive tape article of claim 12, wherein the pressure sensitive material is selected from the group consisting of: natural rubber, synthetic rubber, synthetic elastomers, acrylates, and blends thereof.

* * * * *